(12) United States Patent
Batarseh (10) Patent No.: US 11,028,686 B2
(45) Date of Patent: Jun. 8, 2021

(54) SONO TOOL AND RELATED SYSTEMS AND METHODS

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 210 days.

(21) Appl. No.: 16/439,395

(22) Filed: Jun. 12, 2019

(65) Prior Publication Data

US 2020/0392830 A1 Dec. 17, 2020

(51) Int. Cl.

| | |
|---|---|
| *E21B 47/00* | (2012.01) |
| *E21B 47/12* | (2012.01) |
| *E21B 47/18* | (2012.01) |
| *E21B 49/10* | (2006.01) |
| *G01N 29/24* | (2006.01) |
| *G01N 29/44* | (2006.01) |
| *E21B 47/002* | (2012.01) |
| *E21B 47/135* | (2012.01) |
| *G01N 21/954* | (2006.01) |

(52) U.S. Cl.
CPC .......... *E21B 47/002* (2020.05); *E21B 47/135* (2020.05); *E21B 47/18* (2013.01); *E21B 49/10* (2013.01); *G01N 29/2418* (2013.01); *G01N 29/4436* (2013.01); *G01N 29/4472* (2013.01); *G01N 2021/9544* (2013.01); *G01N 2021/9546* (2013.01); *G01N 2291/0224* (2013.01); *G01N 2291/02809* (2013.01)

(58) Field of Classification Search
CPC .......... E21B 43/24; E21B 47/18; E21B 49/10; E21B 47/002; E21B 47/135; G01N 2021/9544; G01N 2021/9546; G01N 2291/0224; G01N 2291/02809; G01N 29/2418; G01N 29/4436; G01N 29/4472
See application file for complete search history.

(56) References Cited

U.S. PATENT DOCUMENTS

| | | | |
|---|---|---|---|
| 3,583,766 A | 6/1971 | Padberg, Jr. | |
| 4,060,128 A | 11/1977 | Wallace | |
| 4,074,758 A | 2/1978 | Scott | |
| 4,345,650 A | 8/1982 | Wesley | |
| 5,397,961 A | 3/1995 | Ayers et al. | |
| 5,659,173 A | 8/1997 | Putterman et al. | |
| 6,041,248 A * | 3/2000 | Wang ................. | G01N 21/4795 600/407 |

(Continued)

FOREIGN PATENT DOCUMENTS

| | | |
|---|---|---|
| WO | WO-95/23413 A1 | 8/1995 |
| WO | WO-97/49274 A2 | 12/1997 |

(Continued)

OTHER PUBLICATIONS

Löfstedt, R. et al., Scaling laws for sonoluminescence, The Journal of the Acoustical Society of America, 92: 2453 (1992).

(Continued)

*Primary Examiner* — Daniel P Stephenson
(74) *Attorney, Agent, or Firm* — Choate, Hall & Stewart LLP; Charles E. Lyon; Alexander D. Augst (57) ABSTRACT

This application relates to tools, systems, and methods for stimulating hydrocarbon bearing formations using energy from sonoluminescence.

26 Claims, 9 Drawing Sheets

(56) References Cited

U.S. PATENT DOCUMENTS

| | | |
|---|---|---|
| 6,227,293 B1 | 5/2001 | Huffman et al. |
| 7,002,169 B2 | 2/2006 | Thomas et al. |
| 7,370,701 B2 | 5/2008 | Surjaatmadja et al. |
| 7,461,965 B2 | 12/2008 | Satterwhite |
| 7,461,966 B2 | 12/2008 | Satterwhite |
| 7,510,322 B2 | 3/2009 | Satterwhite |
| 8,026,496 B2 | 9/2011 | Barker et al. |
| 8,699,666 B2 | 4/2014 | Putterman et al. |
| 9,057,232 B2 | 6/2015 | Cioanta et al. |
| 9,266,752 B2 | 2/2016 | McGuire |
| 9,850,750 B1 | 12/2017 | DiFoggio |
| 2003/0201101 A1 | 10/2003 | Kostrov et al. |
| 2006/0158956 A1* | 7/2006 | Laugharn, Jr. .......... B01F 11/02 366/127 |
| 2007/0138911 A1 | 6/2007 | Tessien et al. |
| 2011/0130613 A1 | 6/2011 | Putterman et al. |
| 2013/0112900 A1* | 5/2013 | Haibara .............. G01N 21/274 250/573 |
| 2014/0027110 A1 | 1/2014 | Ageev et al. |
| 2014/0044235 A1 | 2/2014 | Camara et al. |
| 2014/0305877 A1 | 10/2014 | Cioanta et al. |
| 2017/0175505 A1 | 6/2017 | Curlett |
| 2017/0204707 A1 | 7/2017 | Clark et al. |
| 2017/0362926 A1* | 12/2017 | Difoggio ................. E21B 47/18 |
| 2019/0111457 A1* | 4/2019 | Haeggstrom ......... F28G 15/003 |
| 2020/0392830 A1* | 12/2020 | Batarseh ............... E21B 47/002 |

FOREIGN PATENT DOCUMENTS

| | | |
|---|---|---|
| WO | WO-98/22034 A2 | 5/1998 |
| WO | WO-01/39201 A2 | 5/2001 |
| WO | WO-2020/250023 A1 | 12/2020 |

OTHER PUBLICATIONS

International Search Report for PCT/IB19/56777, 4 pages (dated Feb. 27, 2020).

Written Opinion for PCT/IB19/56777, 8 pages (dated Feb. 27, 2020).

\* cited by examiner

SONO TOOL AND RELATED SYSTEMS AND METHODS

TECHNICAL FIELD

This application relates to a tool and related systems and methods for stimulating hydrocarbon bearing formations using energy generated from sonoluminescence.

BACKGROUND

Wellbore stimulation is a branch of petroleum engineering focused on ways to enhance the flow of hydrocarbons from a formation to the wellbore for production. To produce hydrocarbons from the targeted formation, the hydrocarbons in the formation need to flow from the formation to the wellbore in order to be produced and flow to the surface. The flow from the formation to the wellbore is carried out by the means of formation permeability. When formation permeability is low, stimulation is applied to enhance the flow. Stimulation can be applied around the wellbore and into the formation to build a network in the formation. The first step for stimulation is commonly perforating the casing and cementing in order to reach the formation. One way to perforate the casing is the use of a shaped charge. Shaped charges are lowered into the wellbore to the target release zone. The release of the shaped charge creates short tunnels that penetrate the steel casing, the cement and into the formation.

The use of shaped charges has several disadvantages. For example, shaped charges produce a compact zone around the tunnel, which reduces permeability and therefore production. The high velocity impact of a shaped charge crushes the rock formation and produces very fine particles that plug the pore throat of the formation reducing flow and production. There is the potential for melt to form in the tunnel. There is no control over the geometry and direction of the tunnels created by the shaped charges. There are limits on the penetration depth and diameter of the tunnels. There is a risk in involved while handling the explosives at the surface.

The second stage of stimulation typically involves pumping fluids through the tunnels created by the shaped charges. The fluids are pumped at rates exceeding the formation breaking pressure causing the formation and rocks to break and fracture, this is called hydraulic fracturing. Hydraulic fracturing is carried out mostly using water based fluids called hydraulic fracture fluid. The hydraulic fracture fluids can be damaging to the formation, specifically shale rocks. Hydraulic fracturing produces fractures in the formation, creating a network between the formation and the wellbore.

Hydraulic fracturing also has several disadvantages. First, as noted above, hydraulic fracturing can be damaging to the formation. Additionally, there is no control over the direction of the fracture. Fractures have been known to close back up. There are risks on the surface due to the high pressure of the water in the piping. There are also environmental concerns regarding the components added to hydraulic fracturing fluids and the need for the millions of gallons of water required for hydraulic fracturing.

Accordingly, there is a need for a tool and related systems and methods of using the tool to deliver alternative sources of energy to a wellbore in a hydrocarbon-bearing formation.

SUMMARY

The present disclosure relates to new tools and methods for stimulating a subsurface formation utilizing energy generated by sonoluminescence. Various embodiments of the disclosed tools and methods include deploying the tool down a wellbore, triggering the sonoluminescence event and directing the energy generated by the sonoluminescence towards target regions with the formation. In some embodiments, the tool will be coupled to control unit located on the surface, typically in the vicinity of a wellbore, that provides the fluids and signals necessary to trigger the reaction. In some embodiments, the disclosed tools and methods include means for deploying individual sonoluminescence capsules down the wellbore, where the capsules can be configured to position themselves proximate a target zone in the formation and can be triggered remotely.

Generally, the energy generated via sonoluminescence can be used for many downhole applications, such as establishing or enhancing communication between a wellbore and a hydrocarbon-bearing formation. Sonoluminescence is a physics phenomenon that is still not fully understood by scientists. It is the emission of energy, such as light, by bubbles in a liquid excited by sound. It occurs when a sound wave of sufficient intensity induces a gaseous bubble or cavity within a liquid to collapse quickly. This cavity may take the form of a pre-existing bubble or may be generated through a process known as cavitation. Sonoluminescence in the laboratory can be made to be stable, so that a single bubble will expand and collapse over and over again in a periodic fashion, emitting a burst of light each time it collapses. For this to occur, a standing acoustic wave is set up within a liquid, and the bubble will sit at a pressure anti-node of the standing wave. The frequencies of resonance depend on the shape and size of the container in which the cavity/bubble is contained. The collapsing of the bubble can generate energy equivalent to 14,695 psi and 8,540° F. If this energy is controlled and oriented, it can be harvested for many downhole applications in the wellbore, such as perforation, fracturing, heating, and cleaning up the wellbore from deposits and condensates. The present disclosure describes a variety of tools and methods for harvesting and delivering the energy generated by sonoluminescence to the wellbore.

In one aspect, the application relates to a tool for delivering energy generated by sonoluminescence to a wellbore in a hydrocarbon-bearing formation. The tool includes an elongate body configured for placement within the wellbore and one or more cavity containers disposed along a length of the tool and at least partially disposed within the elongate body. Each cavity container can include a cavity defined by a housing, a liquid port configured to introduce a liquid into the cavity, a gas port configured to introduce one or more gases into the cavity, one or more acoustic transducers disposed adjacent to the cavity and configured to generate a sound wave to induce sonoluminescence in the cavity, and one or more acoustic mirrors disposed adjacent to the cavity and configured to reflect and direct the generated energy from the induced sonoluminescence toward the formation.

In various embodiments, the tool also includes at least one rotational device disposed along a length of the tool and configured to divide the elongate body into at least two segments. At least one of the segments may include a cavity container. The at least one rotational device can be disposed adjacent to the one or more cavity containers and configured to rotate each cavity container relative to a longitudinal axis of the tool. The at least one rotational device can be actuated hydraulically or electrically. In some embodiments, a single port can be used as the liquid port and as the gas port.

Additionally, a position of the one or more acoustic transducers is adjustable relative to the cavity container, as can be a position of the one or more acoustic mirrors relative to the cavity container. In various embodiments, the acoustic transducer, acoustic mirror, or both can be attached to cavity container or tool in a fixed (for example, via bonding or a mechanical fastener) or movable (for example, a swivel or clevis joint) manner. In embodiments where the transducer or mirror is movably mounted, the mounting arrangement can include a servo motor or similar device to control the positioning of the transducer or mirror relative to the tool in response from a control signal from the surface. In some embodiments, the tool is configured to be lowered down the wellbore by coiled tubing, wireline, or tractors and a position of the transducer or mirror is adjustable at the surface before deploying the tool.

In another aspect, the application relates to a tool for generating energy by sonoluminescence in a wellbore in a hydrocarbon-bearing formation. The tool includes an elongate body configured for placement within the wellbore, a liquid port disposed in the elongate body and configured to receive a liquid from a source of liquid, a gas port disposed in the elongate body and configured to receive one or more gases from a source of gas, a liquid nozzle disposed in the elongate body and configured to introduce a liquid into a cavity within the formation, and a gas nozzle disposed in the elongate body and configured to introduce one or more gases into the cavity.

The tool also includes one or more acoustic transducers disposed on the elongate body and configured to generate a sound wave and one or more acoustic mirrors disposed on the elongate body and configured to reflect and direct the sound wave towards the cavity to induce sonoluminescence in the cavity.

In various embodiments of the foregoing aspect, the cavity can be one or more void spaces within the formation. In some embodiments, the source of liquid, the source of gas, or both are disposed within the elongate body or at a remote location. Additionally, the acoustic transducers of either aspect can be configured to evaluate the formation.

In another aspect, the application relates to a system for delivering energy from sonoluminescence to a wellbore in a hydrocarbon-bearing formation. The system includes a plurality of capsules and means for delivering the capsules down the wellbore. In various embodiments, each capsule includes a housing that defines a cavity, one or more acoustic transducers disposed adjacent to the cavity and configured to generate a sound wave to induce sonoluminescence in the cavity, and one or more rupture disks disposed within the housing and configured to break and release the generated energy from the induced sonoluminescence.

In various embodiments, a density of the plurality of capsules varies amongst individual capsules. In some cases, a density of one of the plurality of capsules is not uniform within the capsule. The capsules may also include one or more gases, one or more liquids, or both. In some embodiments, the housing includes at least one pointed tip configured for engaging the formation.

In yet another aspect, the application relates to a method of delivering energy from sonoluminescence to a wellbore in a hydrocarbon-bearing formation. The method includes the steps of introducing a cavity defined by a housing of a cavity container into the wellbore via a tool, injecting a liquid into the cavity through a liquid port disposed adjacent to the cavity, injecting one or more gases into the cavity through a gas port disposed adjacent to the cavity, activating one or more acoustic transducers disposed adjacent to the cavity to generate a sound wave to induce sonoluminescence in the cavity, and directing the generated energy toward the formation with one or more acoustic mirrors disposed adjacent to the cavity.

In various embodiments of the method, the method may include the following optional steps of introducing a plurality of cavity containers into the wellbore via the tool, connecting one or more of the plurality of cavity containers with a rotational device configured to orient each cavity container relative to a target in the formation, or both.

In another aspect of the method, the method includes delivering a plurality of capsules to the wellbore, where each of the plurality of capsules includes a housing that defines a cavity, one or more acoustic transducers disposed adjacent to the cavity, and one or more rupture disks disposed within the housing. The method also includes activating the one or more acoustic transducers to generate a sound wave to induce sonoluminescence in the cavity and breaking the one or more rupture disks to release the generated energy from the induced sonoluminescence.

In various embodiments, the plurality of capsules is oriented within the wellbore by varying a density of at least one of the plurality of capsules. Additionally, a density of at least one of the plurality of capsules is not uniform within the at least one capsule.

Definitions

In order for the present disclosure to be more readily understood, certain terms are first defined below. Additional definitions for the following terms and other terms are set forth throughout the specification.

In this application, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. As used in this application, the term "comprise" and variations of the term, such as "comprising" and "comprises," are not intended to exclude other additives, components, integers or steps.

About, Approximately: as used herein, the terms "about" and "approximately" are used as equivalents. Unless otherwise stated, the terms "about" and "approximately" may be understood to permit standard variation as would be understood by those of ordinary skill in the art. Where ranges are provided herein, the endpoints are included. Any numerals used in this application with or without about/approximately are meant to cover any normal fluctuations appreciated by one of ordinary skill in the relevant art. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

In the vicinity of a wellbore: As used in this application, the term "in the vicinity of a wellbore" refers to an area of a rock formation in or around a wellbore. In some embodiments, "in the vicinity of a wellbore" refers to the surface area adjacent the opening of the wellbore and can be, for example, a distance that is less than 35 meters (m) from a wellbore (for example, less than 30, less than 25, less than 20, less than 15, less than 10 or less than 5 meters from a wellbore).

Substantially: As used herein, the term "substantially" refers to the qualitative condition of exhibiting total or near-total extent or degree of a characteristic or property of interest.

These and other objects, along with advantages and features of the disclosed systems and methods, will become apparent through reference to the following description and the accompanying drawings. Furthermore, it is to be understood that the features of the various embodiments described are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosed systems and methods and are not intended as limiting. For purposes of clarity, not every component may be labeled in every drawing. In the following description, various embodiments are described with reference to the following drawings, in which.

DETAILED DESCRIPTION

Figure 1:
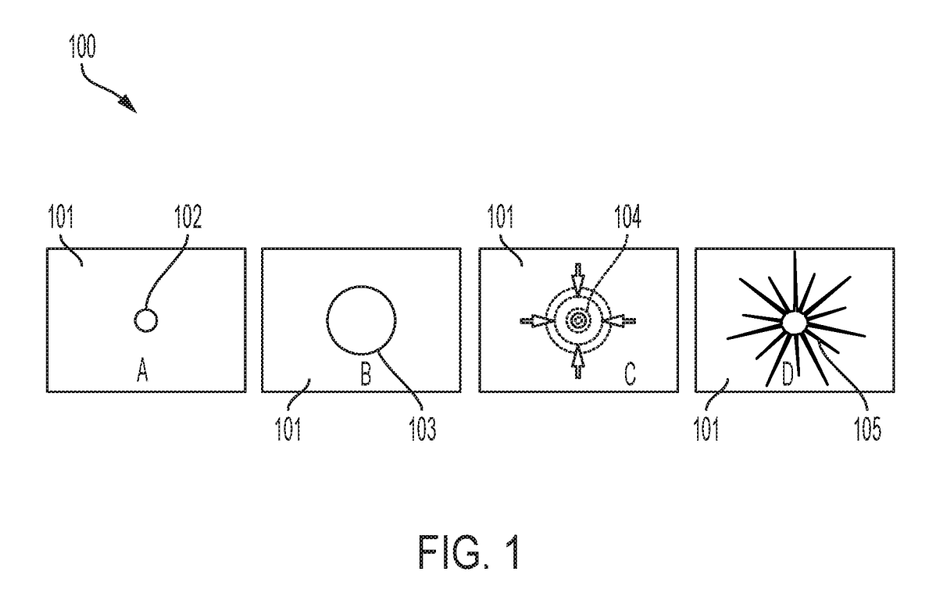
FIG. 1 is a schematic representation of a sonoluminescence process in accordance with one or more embodiments.

FIG. 1 illustrates the process 100 of creating sonoluminescence in accordance with one or more embodiments. In some embodiments, there is a pre-existing gas bubble 102 in a fluid environment 101. In some embodiments, the bubble 102 is generated through a process known as cavitation. The bubble 102 can include one or more gases, such as a noble gas. The fluid environment 101 can be water, or other fluid. The gas bubble 102 can be bombarded with acoustic waves to trap the waves inside the bubble. As a result, the gas bubble 102 can expand to a state shown as 103. The bubble 102 can be exposed to continuing sound waves to cause a sudden collapse as shown as 104, where collapsing releases energy and light as shown as 105.

Generally, the present disclosure describes a tool and related systems and methods to deliver the energy from sonoluminescence down a wellbore of a hydrocarbon-bearing formation. In some embodiments, the tool creates the cavity (or bubble) and releases the energy in situ. The tool is configured for placement within the wellbore.

Figure 2:
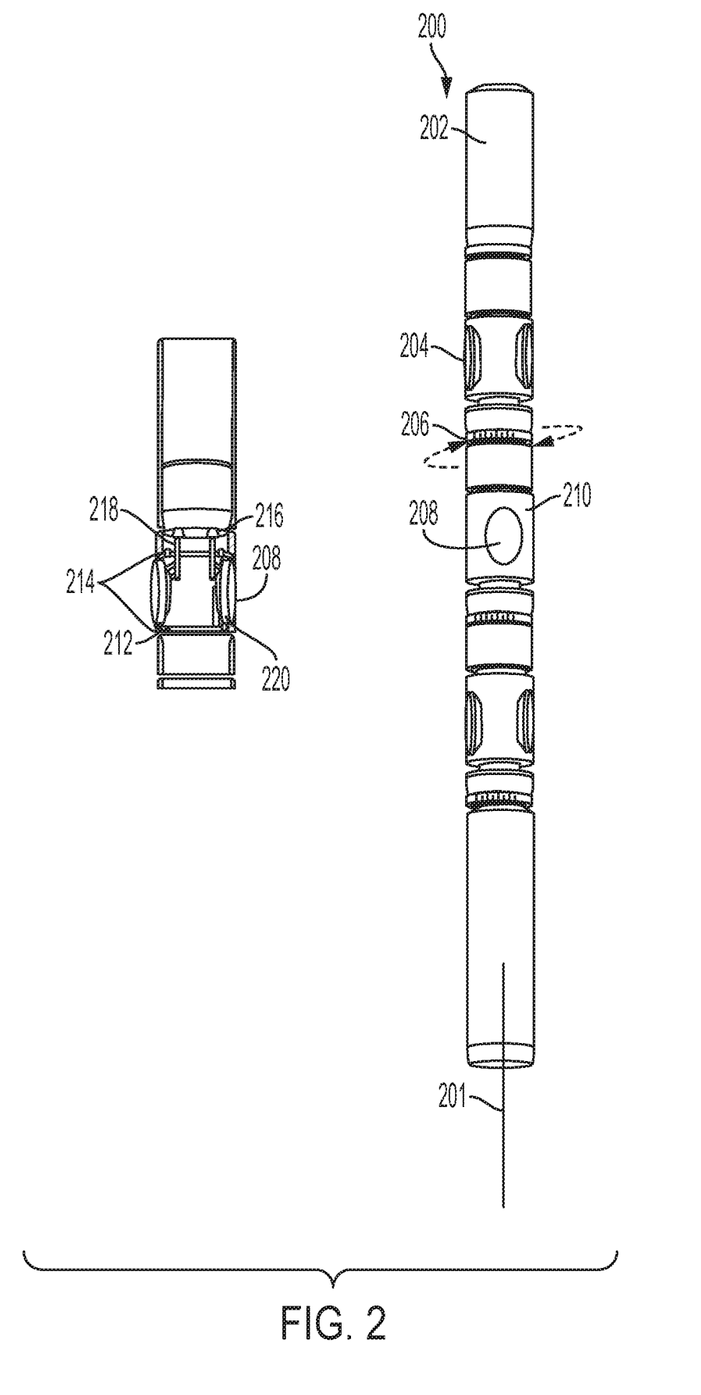
FIG. 2 is a schematic representation of a sono tool configuration for generating and delivering the energy of sonoluminescence for downhole applications in accordance with one or more embodiments.

FIG. 2 depicts one embodiment of a tool 200 for use in delivering the energy generated via sonoluminescence to a wellbore. As shown, the tool 200 includes an elongate body 202 that can be lowered down the wellbore by coiled tubing, wireline, or tractors, as known in the industry. The tool 200 can include one or more segments 204 separated by one or more rotational devices 206. Each segment 204 can include a cavity container 208 disposed therein, where the containers 208 are configured to create and orient the generated energy into the formation. Each cavity container 208 can include a housing 210 that defines a cavity 212 that is configured to hold a liquid and gas. In some embodiments, the liquid is water. In some embodiments, the gas is a noble gas. In some embodiments, at least a portion of the housing 210 may be transparent.

Typically, the liquid is introduced into the cavity 212 through a liquid port 216 disposed adjacent to the cavity 212. The liquid port 216 can be connected to a liquid source through a corresponding liquid line. In some embodiments, the liquid source may be included within the tool 200, and in others, the liquid line can run through the tool 200 and wellbore to a liquid source disposed on the surface. Similarly, the gas can be injected into the cavity 212 through a gas port 218 disposed adjacent to the cavity 212. The gas port 218 can be connected to a gas source through a corresponding gas line. In some embodiments, the gas source may be included within the tool 200, and in others, the gas line can run through the tool 200 and wellbore to a gas source disposed on the surface.

In various embodiments, the tool includes one or more acoustic transducers 214 that can be disposed adjacent to the cavities. In the embodiment shown in FIG. 2, there are two (2) transducers per cavity 212; however, the number and position of the transducers can vary to suit a particular application. In some embodiments, an acoustic transducer is disposed at the top part of the cavity 212, while in others; an acoustic transducer is disposed at the bottom part of the cavity 212. Once activated, the acoustic transducers 214 can generate sound waves that are directed into the cavities. Additionally, in some embodiments, the transducers are movably attached to the cavity container or elongate body to provide means for adjusting the direction of the sound waves generated by the transducers 214.

Generally, the transducer mounting means can include, for example, stud mounting, adhesives, magnetic means, or metal wire. Typically, these mounting means will attach the transducer to the tool in a fixed manner, although not necessarily a permanent one. For example, magnetic means can be used to hold the transducer(s) in a fixed position, but the position can be adjusted at the surface before deploying the tool. Alternatively, the transducer(s) can be movably mounted to the tool via a type of swivel joint. A servo motor can be coupled to the transducer so as to adjust its position relative to the tool in response to a signal. In some embodiments, the signal is generated at the surface (for example, via the control system) and transmitted to the motor via an electric cable. In some cases the signal can be generated in-situ. Other means of mounting and controlling the movement of a transducer are known to persons of skill in the art of wellbore logging.

Figure 3:
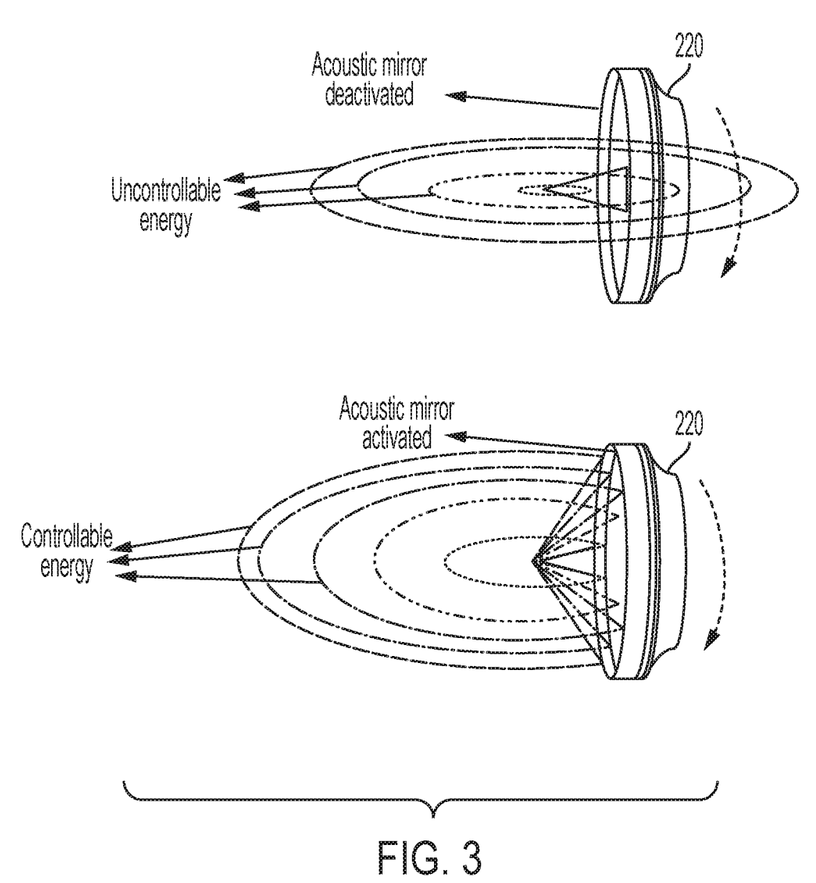
FIG. 3 is a schematic representation of the operation of an acoustic mirror for use with a tool in accordance with one or more embodiments.

In various embodiments, the tool includes one or more acoustic mirrors 220 that can be disposed adjacent to the cavities 212 to control the delivery of the energy generated within the cavities. The detailed operation of the acoustic mirrors 220 is illustrated in FIG. 3. Generally, the acoustic mirrors are used to reflect and focus (concentrate) the sound waves. They can be activated and deactivated by electric signals from the surface or can be passive and not need to be activated.

In the embodiment shown in FIG. 2, there are two (2) mirrors per cavity 212; however, the number and position of the mirrors can vary to suit a particular application. The mirrors 220 are movably attached to the cavity container or elongate body to provide means for adjusting their position relative to the tool 200. The acoustic mirrors 220 can be attached to the tool and operated via the same means previously discussed with respect to the acoustic transducers.

The rotational devices 206 can be configured to rotate each segment 204 relative to a longitudinal axis 201 of the tool 200. In some embodiments, each segment 204 can be rotated independently so that each cavity container can be oriented towards a desired target. In various embodiments, the rotational devices can be driven hydraulically, pneumatically, or by electric power (for example, servo motors).

In operation, once the fluid and gas have been injected into the cavity or cavities 212, thereby forming at least one bubble within each cavity, the acoustic transducers 214 are activated. The generated sound waves merge in the gas bubble(s) and are stored in a form of energy. The bubble will remain at balance until another acoustic transducer 214 is triggered and excited to produce another sound wave with the same or different frequencies. This will result in the collapse of the bubble(s) and release of the energy into the formation.

The energy released into the formation is controlled by the acoustic mirrors 220. The mirrors 220 can prevent the energy from traveling backward and damaging the tool 200 and also help to focus and direct the energy towards the desired targets. FIG. 3 depicts one of the acoustic mirrors in an activated and a deactivated state. Generally, when the acoustic mirror 220 is absent or deactivated, the energy generated from sonoluminescence is released uncontrollably and can travel in any direction, where it might damage the tool 200 or the wrong portion of the wellbore or formation. In contrast, when the acoustic mirror 220 is activated, it can direct, redirect and reflect the acoustic energy towards the desired target.

The present disclosure also describes a system of delivering energy from sonoluminescence down a wellbore in a hydrocarbon-bearing formation. The system can include one or more capsules which can be premanufactured on the surface and then lowered down the wellbore. After placement within the wellbore, the capsule can be activated to deliver sonoluminescence energy to the formation.

Figure 4:
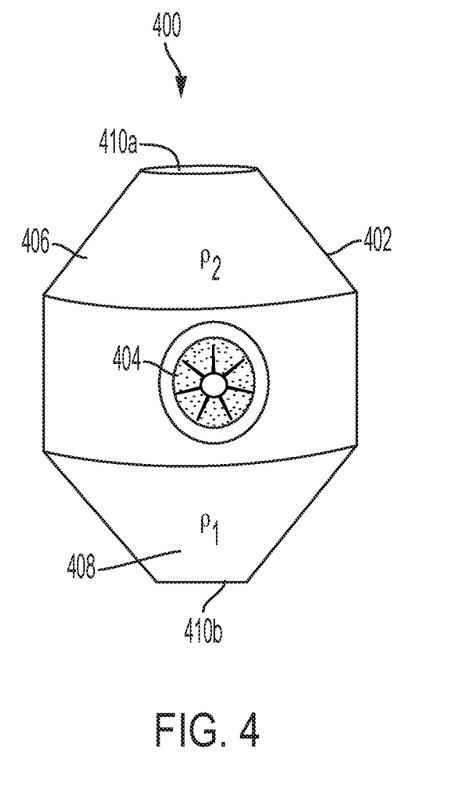
FIG. 4 is a schematic representation of an individual capsule for generating and delivering the energy of sonoluminescence for downhole applications in accordance with one or more embodiments.

FIG. 4 illustrates one embodiment of a capsule 400 in accordance with one or more embodiments. The capsule 400 includes a housing 402 that defines a cavity 404. A liquid and a gas can be encapsulated in the cavity 404, as well as means for generating acoustic energy. For example, an acoustic transducer can be coupled to each capsule or one or more acoustic transducers can also be lowered down the wellbore proximate the capsules 400. The amount of energy stored in the capsule can be adjusted depending on the exact composition of the formation and the energy needed for a specific task or application.

As shown, the capsule 400 includes a top portion 406 and a bottom portion 408 that are substantially frusto-conical in shape; however, other shapes and configurations for the capsule can be selected to suit a particular application. In some embodiments, the top and bottom portions 406, 408 are manufactured having different densities, which will help stabilize and orient the capsule in a desired location within the wellbore. In some embodiments, the bottom portion 408 has a higher density than the top portion 406.

In order to release the stored energy in a controllable way, the capsule 400 will include one or more rupture disks 410. As shown in FIG. 4, rupture disks 410 are disposed on the distal ends of the top and bottom portions 406, 408 of the capsule body; however, other locations and numbers of rupture disks 410 can be selected to suit a particular application.

Once activated by a control signal, the rupture disk 410 can break to release the stored energy. In some embodiments, a signal can be relayed from the surface once it is determined that the capsules 400 have been properly placed. In some embodiments, a seismic wave is generated that causes the capsules 400 to collapse and release their stored energy via the rupture disks 410. Alternatively, the rupture disks 410 can be manufactured to rupture at a threshold pressure. In some embodiments, the rupture pressure can vary between capsules and even disks.

In some embodiments, a rupture disk 410a with a low pressure breaking threshold is installed in the top portion 406 of the capsule body while a rupture disk 410b with a high pressure breaking threshold is installed in the bottom portion 408 of the capsule body. Therefore, once the capsule is activated, the top rupture disk 410a can release the energy vertically upward. Meanwhile, the bottom rupture disk 410b can act as a safety valve in the case the top rupture disk 410a malfunctions. Different capsule configurations can be manufactured for different applications. In addition, the sizes and shapes of the capsules 400 can also be controlled based on the energy required for a particular application.

Figure 5:
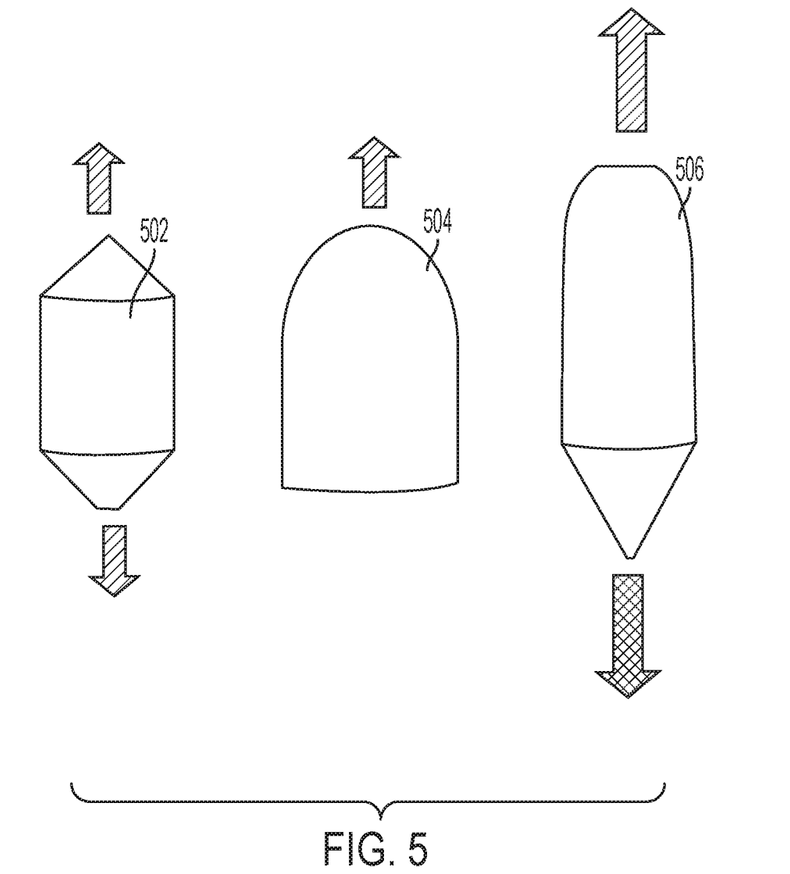
FIG. 5 is a schematic representation of alternative configurations of a capsule for generating and delivering the energy of sonoluminescence for downhole applications in accordance with one or more embodiments.

FIG. 5 depicts several alternative capsule configurations. Capsule 502 is designed to release energy from both ends, with a pointed tip on each end. Capsule 504 can have one rupture disk located at one end of its body and configured to release energy in only one direction. Capsule 506 can include a rupture disk at one end and a pointed tip at the opposite end. When activated, the top rupture disk of capsule 506 can break to release the stored energy, while the capsule body can be pushed in the opposite direction with the pointed tip toward the formation. The tip can be configured to penetrate the formation to cause micro cracks or weaken the formation. In some embodiments, the capsules can include one or more pointed rupture disks, where the pointed ends can help cause fractures within the formation. In some embodiments, the capsules will have an approximate diameter of 0.5 to 4.0 inches to suit the size of the wellbore. Other diameters and shapes are contemplated and can be selected to suit a particular application.

Figure 6:
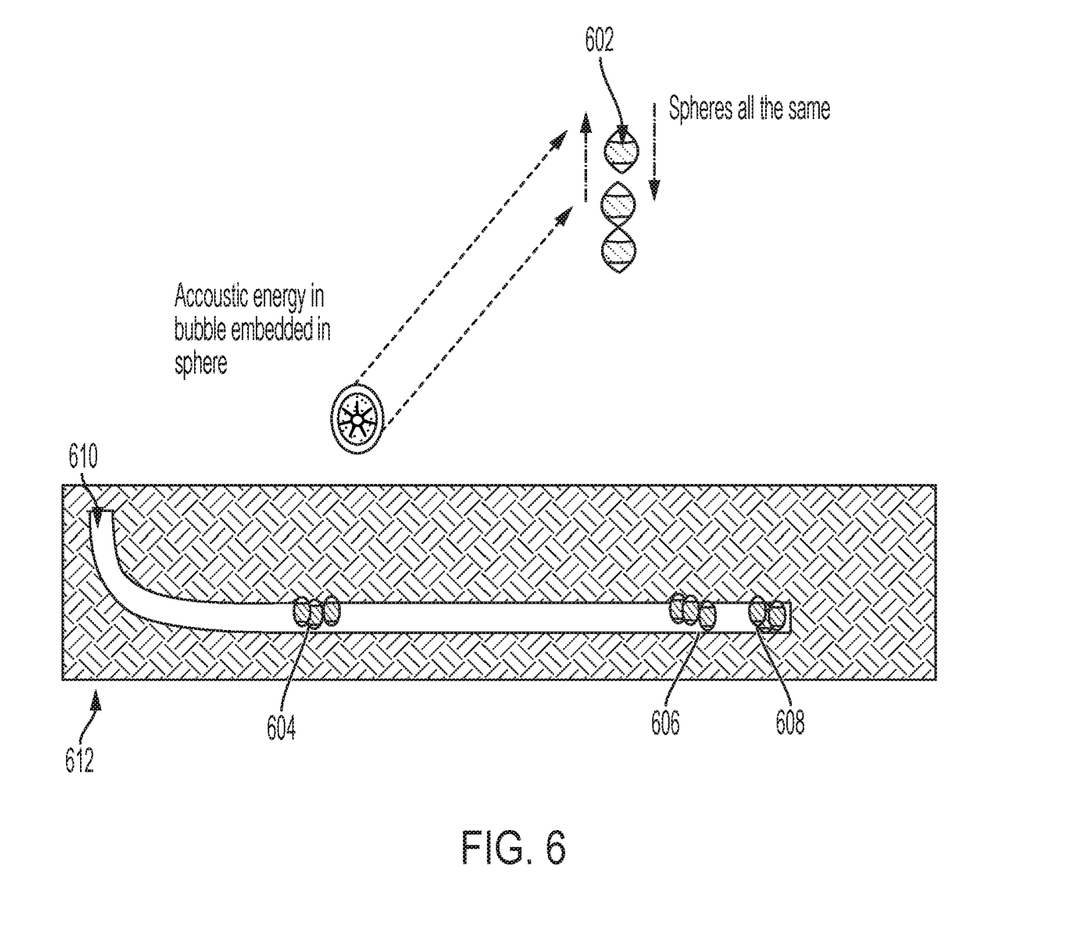
FIG. 6 is a schematic representation of a method of delivering a plurality of capsules to a wellbore in accordance with one or more embodiments.

There are, however, challenges associated with delivering the energy generated by sonoluminescence via capsules. FIG. 6 represents a process 600 in which a plurality of capsules are lowered down a wellbore 610 in a formation 612. Capsules 602, 604, 606 and 608 can all be in exactly the same configuration with the same densities when injected into the wellbore. Because each capsule has the same density, they will tend to aggregate into clusters unevenly distributed in the wellbore, regardless whether a horizontal or vertical wellbore. When the capsules are activated, the stored energy can be released in random locations, including in some unwanted areas.

Figure 7:
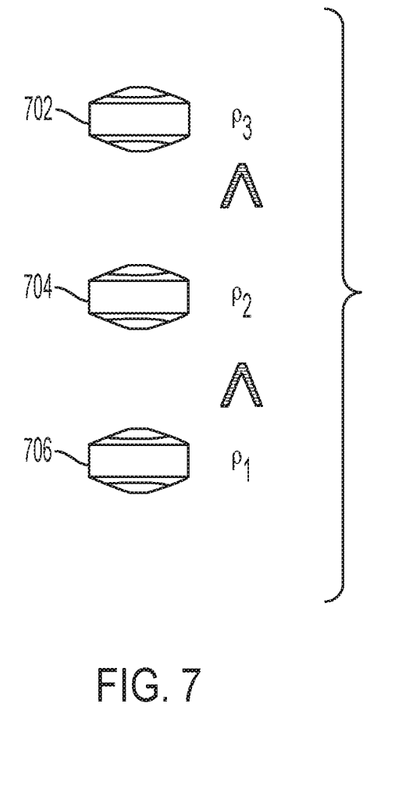
FIG. 7 is a schematic representation of a density comparison of capsules in accordance with one or more embodiments.
Figure 8:
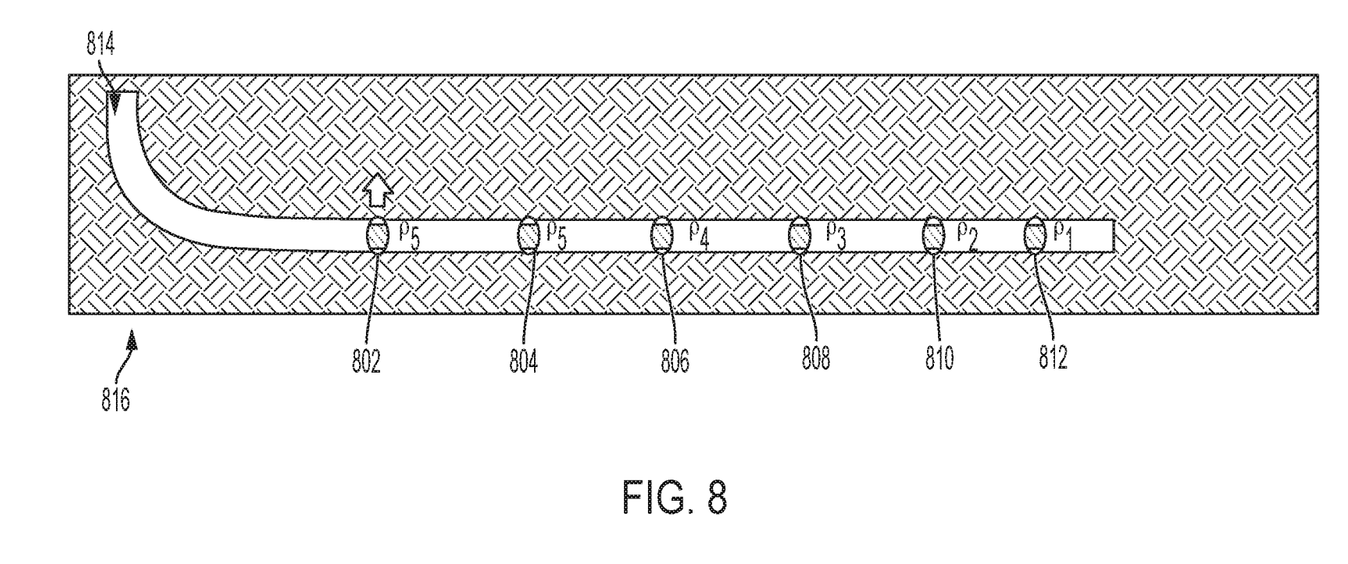
FIG. 8 is a schematic representation of an alternative method of delivering a plurality of capsules to a wellbore in accordance with one or more embodiments.

FIGS. 7 and 8 represent methods to overcome these challenges. As shown in FIG. 7, the capsules 702, 704, 706 can each be made with different densities so they can be distributed at different depths within the wellbore. Specifically, capsule 706 will have a greater density compared with capsules 702, 704 and, therefore, capsule 706 will settle at the deepest location after injected into the wellbore. Similarly, the densities of capsules 704 and 702 can be configured differently so that they too will settle at different depths within the wellbore. In some embodiments, groups of capsules can be used where the densities of a plurality of capsules within one group can be substantially the same, while different from other groups of capsules.

FIG. 8 depicts a plurality of capsules deployed within a horizontal wellbore 814 within the formation 816. The capsules 802, 804, 806, 808, 810, 812 are each manufactured with different densities. In order to distribute the capsules at different depths, the wellbore can be drilled with a slight incline to allow the capsules to be segregated within the wellbore based on the densities, as shown in FIG. 8. As shown in FIG. 8, the capsules 802, 804, 806, 808, 810, 812 will self-distribute based on their different densities. The heaviest capsules will move to the bottom and the lighter to the top in the inclined horizontal wellbore depicted. In addition, the capsules will orient themselves within the wellbore based on the varying densities within each individual capsule. Once the capsules are activated by any of the means previously described, the stored energy can be released at the desired target locations.

The present disclosure also describes a tool to create gas bubbles in the formation and deliver sonoluminescence energy accordingly. The tool is configured to inject a fluid and gas into the formation and target acoustic waves to induce sonoluminescence within the formation. Generally, any manmade or naturally occurring voids within the formation can provide the cavity.

Figure 9:
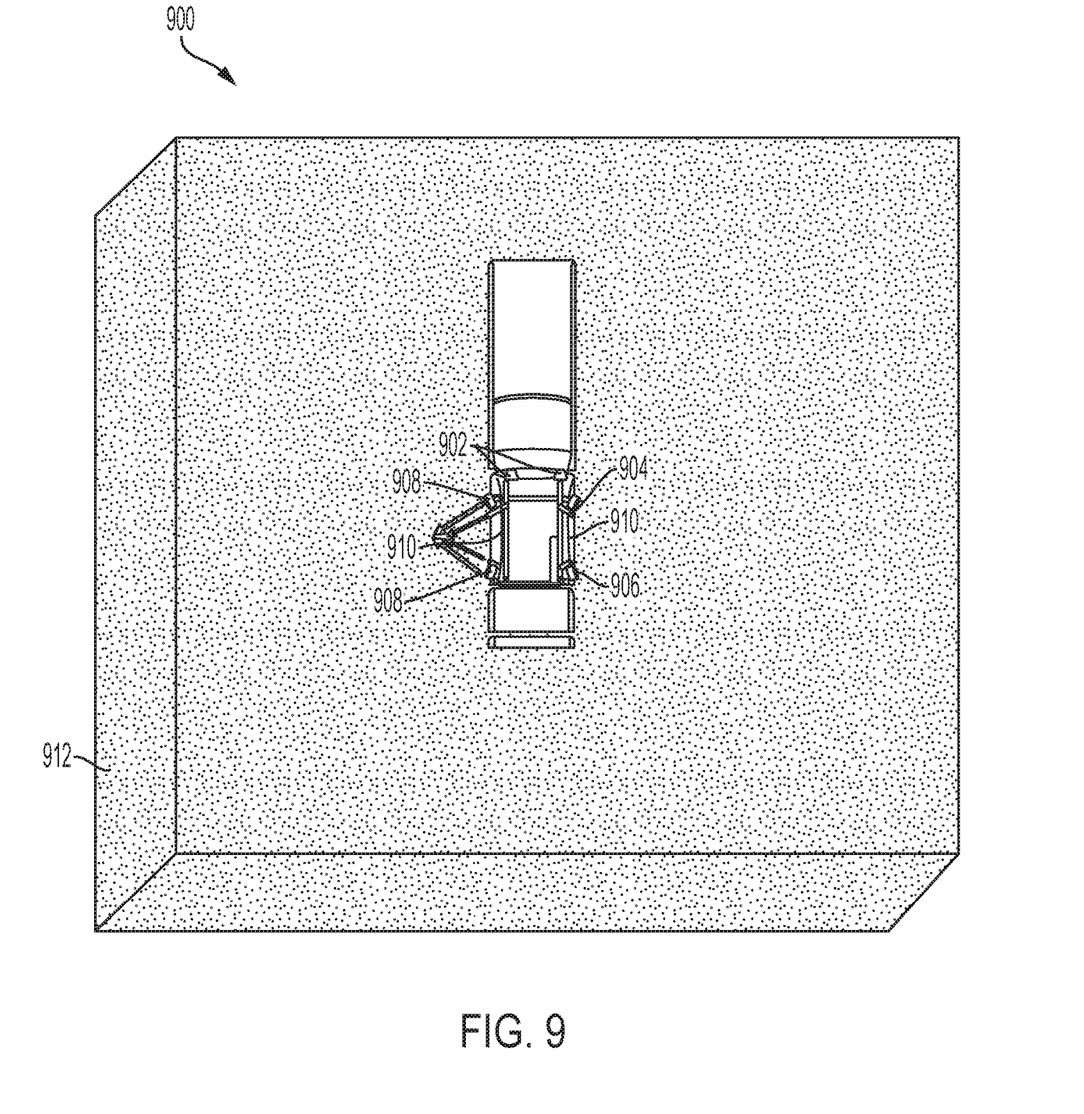
FIG. 9 is a schematic representation of a portion of a sono tool deployed within a wellbore to generate and deliver the energy of sonoluminescence to a formation in accordance with one or more embodiments.

FIG. 9 depicts an alternative tool 900 in accordance with one or more embodiments and configured to promote the generation of energy via sonoluminescence within the formation 912. The tool 900 include gas and water ports 902 configured for receiving one or more gases and a liquid, such as water, that can delivered into the formation. In some embodiments, the ports 902 are coupled to gas and water sources via conventional plumbing methods used in the industry. The gas and water sources can be located on the surface or be disposed with the body of the tool 900.

The tool 900 also includes at least one gas nozzle 904, and at least one water nozzle 906 coupled to the ports 902 and disposed on an outer surface of the tool and configured to introduce a liquid and a gas to the formation 912. Also included are one or more acoustic transducers 908, and one or more acoustic mirrors 910. As long as the formation 912 has natural void spaces, such as high porosity or fractures, the apparatus 900 can inject gas and water into the formation 912 with the gas nozzle 904 and water nozzle 906. In some cases, there may be manmade voids present from other operations that were carried out on the wellbore that are also usable.

The nozzles 904, 906 can be aligned with the acoustic transducers 908 and focused in the same direction. After the void space in the formation 912 is filled with water and gas, the acoustic transducers 908 can be activated to generate sound waves toward the formation. The acoustic mirrors 910 can be disposed adjacent to the acoustic transducers 908 to protect the tool and focus the energy towards the formation 912. The time it takes to create the bubble is predetermined in the lab, so that the acoustic transducers can be triggered only for specific periods of time to make the bubble. Once the sonoluminescence is induced, the energy can be released into the formation.

In addition, the acoustic transducers 908 can also be used for formation evaluation and logging to determine the location to create the bubble. The acoustic transducers can also be used to create acoustic images in the formation, and based on that, the acoustic transducers 908 can be oriented to focus the sound wave at location where there is void space or fractures to create the bubble.

It is contemplated that systems, devices, methods, and processes of the present application encompass variations and adaptations developed using information from the embodiments described in the following description. Adaptation or modification of the methods and processes described in this specification may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

What is claimed:

What is claimed:

1. A tool for delivering energy generated by sonoluminescence to a wellbore in a hydrocarbon-bearing formation, the tool comprising:
    an elongate body configured for placement within the wellbore;
    one or more cavity containers disposed along a length of the tool and at least partially disposed within the elongate body, where each of the one or more cavity containers comprises:
    a cavity defined by a housing;
    a liquid port configured to introduce a liquid into the cavity;
    a gas port configured to introduce one or more gases into the cavity;
    one or more acoustic transducers disposed adjacent to the cavity and configured to generate a sound wave to induce sonoluminescence in the cavity; and
    one or more acoustic mirrors disposed adjacent to the cavity and configured to reflect and direct the generated energy from the induced sonoluminescence toward the formation.

2. The tool of claim 1 further comprising at least one rotational device disposed along a length of the tool and configured to divide the elongate body into at least two segments.

3. The tool of claim 2, where at least one of the segments comprises a cavity container.

4. The tool of claim 2, where the at least one rotational device is disposed adjacent to the one or more cavity containers and configured to rotate the cavity container relative to a longitudinal axis of the tool.

5. The tool of claim 2, where the rotational device can be actuated hydraulically or electrically.

6. The tool of claim 1, where a single port can be used as the liquid port and as the gas port.

7. The tool of claim 1, where a position of the one or more acoustic transducers is adjustable relative to the cavity container.

8. The tool of claim 1, where a position of the one or more acoustic mirrors is adjustable relative to the cavity container.

9. The tool of claim 1, where the tool is configured to be lowered down the wellbore by coiled tubing, wireline, or tractors.

10. The tool of claim 1, where the acoustic transducers are also configured to evaluate the formation.

11. A tool for delivering energy generated by sonoluminescence to a wellbore in a hydrocarbon-bearing formation, the tool comprising:
an elongate body configured for placement within the wellbore;
a liquid port disposed in the elongate body and configured to receive a liquid from a source of liquid;
a gas port disposed in the elongate body and configured to receive one or more gases from a source of gas;
a liquid nozzle disposed in the elongate body and configured to introduce a liquid into a cavity within the formation;
a gas nozzle disposed in the elongate body and configured to introduce one or more gases into the cavity;
one or more acoustic transducers disposed on the elongate body and configured to generate a sound wave; and
one or more acoustic mirrors disposed on the elongate body and configured to reflect and direct the sound wave towards the cavity to induce sonoluminescence in the cavity.

12. The tool of claim 11, where the cavity comprises one or more void spaces within the formation.

13. The tool of claim 11, where the source of liquid is disposed within the elongate body or at a remote location.

14. The tool of claim 11, where the source of one or more gases is disposed within the elongate body or at a remote location.

15. A system for delivering energy from sonoluminescence to a wellbore in a hydrocarbon-bearing formation, the system comprising:
a plurality of capsules; and
means for delivering the capsules down the wellbore, where each capsule comprises:
a housing that defines a cavity;
one or more acoustic transducers disposed adjacent to the cavity and configured to generate a sound wave to induce sonoluminescence in the cavity; and
one or more rupture disks disposed within the housing and configured to break and release the generated energy from the induced sonoluminescence.

16. The system of claim 15, where a density of the plurality of capsules varies amongst individual capsules.

17. The system of claim 15, where a density of one of the plurality of capsules is not uniform within the capsule.

18. The system of claim 15, where the cavity comprises one or more gases.

19. The system of claim 15, where the cavity comprises one or more liquids.

20. The system of claim 15, where the housing comprises at least one pointed tip configured for engaging the formation.

21. A method for delivering energy from sonoluminescence to a wellbore in a hydrocarbon-bearing formation, the method comprising the steps of:
introducing a cavity defined by a housing of a cavity container into the wellbore via a tool;
injecting a liquid into the cavity through a liquid port disposed adjacent to the cavity;
injecting one or more gases into the cavity through a gas port disposed adjacent to the cavity;
activating one or more acoustic transducers disposed adjacent to the cavity to generate a sound wave to induce sonoluminescence in the cavity; and
directing the generated energy toward the formation with one or more acoustic mirrors disposed adjacent to the cavity.

22. The method of claim 21 further comprising the step of introducing a plurality of cavity containers into the wellbore via the tool.

23. The method of claim 22 further comprising the step of connecting one or more of the plurality of cavity containers with a rotational device configured to orient the cavity container relative to a target in the formation.

24. A method for delivering energy from sonoluminescence to a wellbore in a hydrocarbon-bearing formation, the method comprising the steps of:
delivering a plurality of capsules to the wellbore, where each of the plurality of capsules comprises:
a housing that defines a cavity,
one or more acoustic transducers disposed adjacent to the cavity, and
one or more rupture disks disposed within the housing;
activating the one or more acoustic transducers to generate a sound wave to induce sonoluminescence in the cavity; and
breaking the one or more rupture disks to release the generated energy from the induced sonoluminescence.

25. The method of claim 24, where the plurality of capsules are oriented within the wellbore by varying a density of at least one of the plurality of capsules.

26. The method of claim 24, where a density of at least one of the plurality of capsules is not uniform within the at least one capsule.

* * * * *